May 1, 1951  A. A. BERESTNEFF ET AL  2,550,665
ABSORPTION REFRIGERATION SYSTEM
Filed Aug. 22, 1946
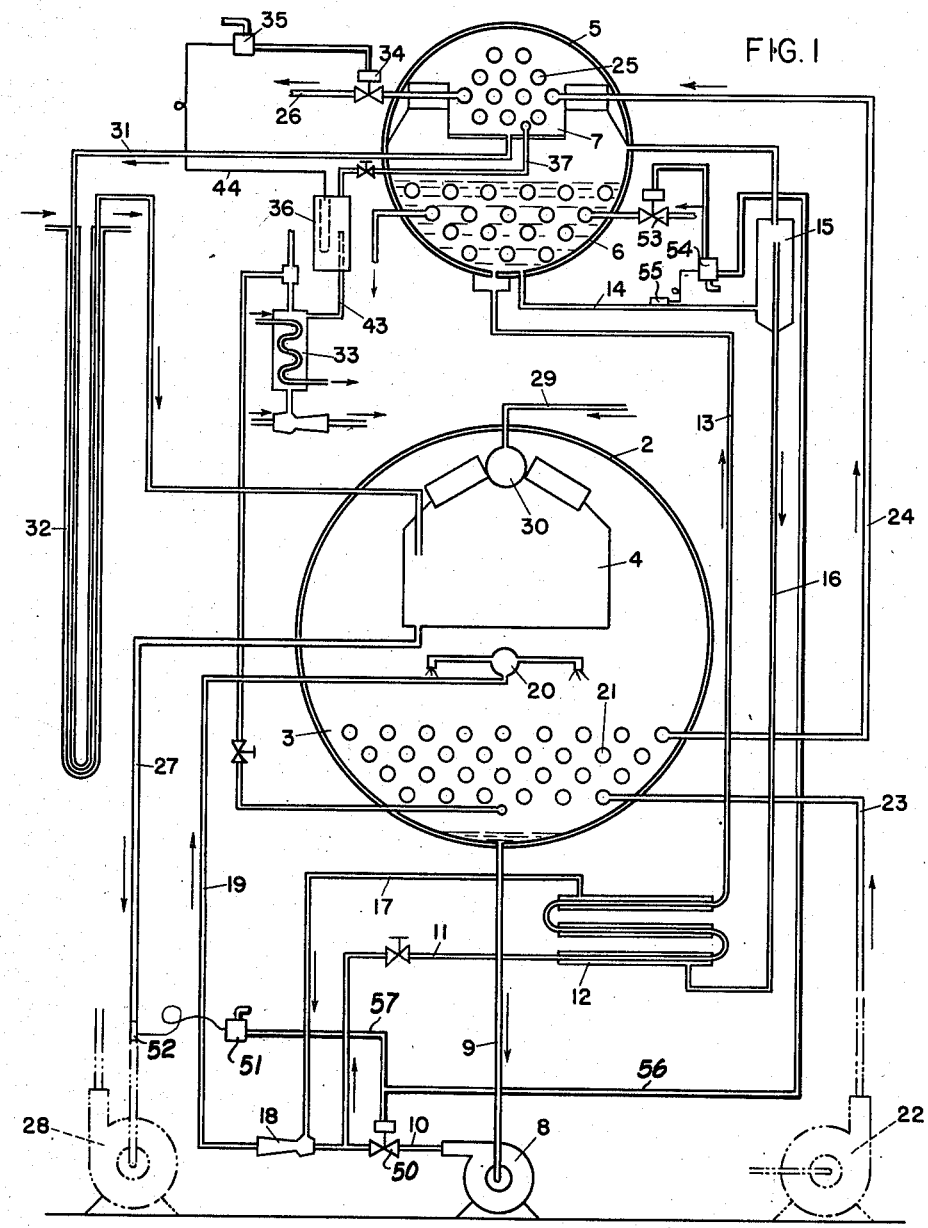
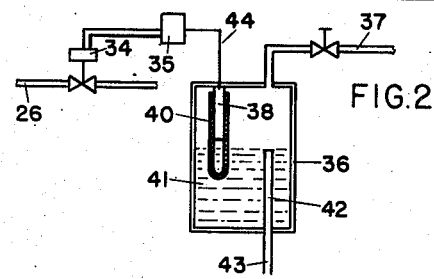
FIG.2
INVENTOR.
Alexis A. Berestneff
and
BY William L. McGrath
atty Patented May 1, 1951

2,550,665

UNITED STATES PATENT OFFICE 2,550,665

ABSORPTION REFRIGERATION SYSTEM

Alexis A. Berestneff and William L. McGrath, Syracuse, N. Y., assignors to Carrier Corporation, Syracuse, N. Y., a corporation of Delaware Application August 22, 1946, Serial No. 692,296

5 Claims. (Cl. 62—5)

This invention relates to refrigeration systems and more particularly to an absorption refrigeration system including an improved control arrangement for controlling the flow of cooling or condensing fluid through the tubes of the absorber and condenser of the system.

In the co-pending application of Alexis A. Berestneff entitled "Refrigeration Systems," Serial No. 683,387, filed July 13, 1946, and in the co-pending application of Alexis A. Berestneff and William L. McGrath entitled "Refrigeration Systems," Serial No. 683,390, filed July 13, 1946, there are disclosed and claimed an absorption refrigeration system and a control arrangement therefor in which the present invention may be readily included. It will be understood, of course, the present invention is not limited to its use in connection with the absorption refrigeration system or the control arrangement therefor described in the co-pending applications above referred to but may be embodied in any type of refrigeration system in which it is desired to achieve accurate control of the flow of condensing or cooling fluid through heat exchange elements of the system.

The chief object of the present invention is to provide an absorption refrigeration system including an improved control arrangement for regulating the flow of cooling fluid through the tubes of the condenser and/or the absorber.

An object of the invention is to provide a control arrangement responsive to saturation temperature corresponding to pressure in an element of the absorption refrigeration system for regulating the flow of cooling fluid through the tubes of the condenser and/or the absorber of the system. Other objects of our invention will be readily perceived from the following description.

This invention relates to an absorption refrigeration system which comprises in combination an absorber, an evaporator, a shell containing a generator and a condenser, a desired pressure being maintained in said shell, the absorber, evaporator, generator and condenser being disposed in a closed circuit, means for passing cooling fluid through the condenser and the absorber, and means responsive to saturation temperature corresponding to pressure in the shell for regulating the flow of cooling fluid through the condenser and the absorber.

The attached drawing illustrates a preferred embodiment of the invention in which:

Figure 1 is a diagrammatic view illustrating the operation of an absorption refrigeration system including the control arrangement of our invention; and Figure 2 is a fragmentary section view in exaggerated scale illustrating the control arrangement of our invention.

Referring to the drawing, Figure 1 illustrates diagrammatically an absorption refrigeration system including the improved control arrangement of our invention. The system may include a horizontally extending shell 2 having an absorber 3 disposed in the bottom thereof and an evaporator 4 disposed in the upper portion of the shell. A second shell 5 is supported above shell 2 and includes a generator 6 disposed at the bottom thereof and a condenser 7 disposed in the upper portion of the shell 5. Weak solution is withdrawn from absorber 3 by pump 8 through line 9 and is forwarded to the generator 6 through lines 10, 11, heat exchanger 12 and the line 13. Strong solution is withdrawn from generator 6 through line 14, overflow arrangement 15, line 16, heat exchanger 12, line 17, to ejector 18 which forwards strong solution through line 19 to spray arrangement 20 adapted to spray the solution over the tubes 21 of absorber 3.

The term "weak solution" is used herein to define a solution containing a large amount of refrigerant so that the solution is weak in absorbing properties. The term "strong solution" defines a solution which is relatively deficient in refrigerant and consequently a solution which possesses enhanced properties of refrigerant absorption.

Various combinations of refrigerant and absorber may be used in the system described. A solution consisting of lithium bromide and water is highly satisfactory. Other salt solutions may be used if desired in the system. When the system is operated at high temperature (above freezing temperature) a solution of lithium chloride and water or a solution of sodium hydroxide and water, for example, may be used. When the system is used to obtain low temperature, ammonia, for example, may be employed as a refrigerant.

A pump 22 passes cooling or condensing water through line 23 to the tubes 21 of absorber 3. Condensing water after its passage through the tubes of absorber 3 is directed through line 24 to the tubes 25 of condenser 7. This is a preferred arrangement, of course, and it will be understood the water may be passed in the reverse direction or in parallel lines through the tubes 21, 25 of the absorber and condenser. Any suitable means may be provided to supply water for cooling purposes. The condensing water leaves the tubes 25 of condenser 7 through line 26 and may be directed to a cooling tower or to waste as desired.

A heating medium such as steam is passed through the tubes of generator 6 to boil off or vaporize a portion of the refrigerant from the solution supplied to the generator. The vapor passes upward to condenser 7 and is condensed therein.

Chilled water leaves evaporator 4 through line 27 and is circulated through the heat exchange coil of an air conditioning system, for example, by means of pump 28. The refrigerant (chilled water) is returned from the air conditioning system through line 29 and is sprayed by means of spray arrangement 30 in the evaporator 4. The pressure maintained in shell 2 is such that the refrigerant sprayed therein is flash-cooled, the vapor passing downward to be absorbed by the solution in absorber 3 while the cooled refrigerant is collected in evaporator 4 and may be withdrawn therefrom as described above through line 27. A line 31 serves to forward vapor condensate from condenser 7 to evaporator 4. A pre-cooler arrangement 32 is provided in line 31 in order to assure that the condensate forwarded to the evaporator is maintained at a desired temperature.

Any suitable purge arrangement 33 may be provided to withdraw non-condensible gases from the absorber 3 and the condenser 7.

Solution flow is regulated by valve 50 actuated by thermostat 51 in response to the temperature of refrigerant leaving the evaporator 4 as reflected by bulb 52. Passage of steam to the generator 6 is controlled by valve 53 actuated by thermostat 54 responsive to the temperature of strong solution leaving the generator as reflected by bulb 55. The control point of thermostat 54 may be reset by change in air pressure in line 56 connected to line 57 connecting thermostat 51 and valve 50.

The absorption refrigeration system described above and similar control arrangements therefor are described and claimed in the co-pending applications above referred to and reference is made to such applications for a more complete description thereof.

The concentration of the strong solution leaving generator 6 depends upon the temperature and pressure maintained in shell 5. Pressure in shell 5 may be maintained by means of condenser 7. Pressure in shell 5 is dependent upon the condensing temperature of condenser 7. The amount of cooling or condensing water passing through the tubes 21 of absorber 3 and/or the tubes 25 of condenser 7 may be regulated by means of a valve 34 placed, preferably, in line 26. Valve 34 may be actuated by means of a thermostat control 35.

A casing 36 is mounted adjacent shell 5, preferably in the line connecting purge 33 to the condenser 7. Casing 36 is connected to shell 5 by means of a line 37. Vapor created in shell 5 by generator 6 passes through line 37 to casing 36 and condenses therein. Condensation in casing 36 occurs due to contact of vapor with the interior wall of the casing. As the exterior wall of casing 36 is in contact with ambient atmosphere, the wall is at a temperature lower than the temperature of vapor in the casing 36; hence vapor coming in contact with the interior wall condenses. Within casing 36 is disposed a bulb 38 connected to thermostat control 35. A wick 40 is disposed around the exterior of bulb 38. Vapor passing to casing 36 condenses therein so that a supply of liquid 41 is maintained at the bottom of casing 36. The liquid level of supply 41 is maintained at a desired point sufficient to wet the wick 40 at all times. Within casing 36 there is disposed an extended portion 42 of line 43 connecting casing 36 with purge arrangement 33 which permits a desired quantity of liquid to be maintained in the casing and also serves to purge casing 36 of non-condensible gases which may collect therein from shell 5.

Suitable fluid is disposed in bulb 38, line 44 connecting it to the bellows (not shown) of thermostat control 35. Bulb 38 reflects saturation temperature in casing 36 since wetted wick 40 is disposed around its exterior. Since casing 36 is connected to shell 5 the saturation temperature so reflected corresponds to the pressure maintained in shell 5. A change in saturation temperature as reflected by bulb 38 corresponds to a change in pressure in shell 5; such change reflected by bulb 38 actuates thermostat control 35 to tend to move valve 34 toward a closed or an open position thereby throttling or increasing the flow of cooling or condensing water through the tubes of the absorber and/or the condenser in the arrangement illustrated.

To aid in a full understanding of the present invention the operation of the control will be described. Pressure in shell 5, preferably, is maintained at a desired level. Casing 36 is connected to shell 5 by line 37 so that the pressure therein corresponds to the pressure in shell 5. Since vapor in casing 36 condenses by contact with the wall of the casing exposed to ambient temperature and condensate is maintained at a desired level sufficient to wet wick 40, bulb 38 reflects a saturation temperature corresponding to the pressure maintained in shell 5. Bulb 38 is connected to a bellows included in thermostat control 35. A decrease in temperature permits the fluid in bulb 38, line 44 and the bellows to contract thus moving the bellows in one direction; an increase in temperature of such fluid causes expansion of the bellows to move it in an opposite direction.

Assuming an increase in pressure in shell 5 occurs, the increase in pressure in shell 5 is reflected by bulb 38 indicating a corresponding increase in saturation temperature. The increase in saturation temperature so reflected actuates control 35 to tend to move valve 34 toward an open position thus permitting an increased flow of cooling fluid through the tubes of the condenser and the absorber in order to bring the pressure in shell 5 to the predetermined point.

Assume the pressure in shell 5 decreases. Bulb 38 reflecting a saturation temperature corresponding to such decrease in pressure again actuates control 35 to tend to move valve 34 toward a closed position thus throttling the flow of cooling fluid through the tubes of the condenser and the absorber to permit pressure in shell 5 to increase to a predetermined point. Pressure in shell 5 is thus maintained at approximately a predetermined point. In all cases the present control arrangement being responsive to the pressure maintained in shell 5 reflects such pressure and accurately controls the quantity of cooling fluid flowing through the tubes of the absorber and the condenser in accordance with the pressure in shell 5.

While we have shown bulb 38 connected to thermostat control 35 which actuates valve 34, it will be understood that valve 34 may be selected to include a bellows which is contracted or expanded to open or to close the valve by contraction or expansion of fluid in bulb 38.

The simple control arrangement provided by the present invention may be manufactured inexpensively and provides as satisfactory and accurate control of the flow of condensing water as may be achieved by the use of controls considerably more expensive in initial and in operating costs. The regulating member so controlled may be disposed at any point within the condensing water lines supplying or removing condensing water from the tubes of the absorber and the condenser. If it be desired to supply condensing water to the tubes of the absorber and the condenser in parallel rather than in series, similar regulating members may be provided and may be actuated by the governing means disclosed by the present invention or a plurality of such governing members may be provided.

While we have described and illustrated a preferred embodiment of our invention, it will be understood our invention is not limited thereto since it may be otherwise embodied within the scope of the following claims.

We claim:

1. In combination with an absorption refrigeration system employing water as a refrigerant and including an absorber, an evaporator, a generator and a condenser disposed in a closed circuit, means for passing cooling fluid through the tubes of the condenser, a member for regulating flow of cooling fluid through the tubes of the condenser, and means for governing said member, said means including a casing, a line connecting the casing with the condenser, a bulb in said casing connected by a second line to a bellows exteriorly of said casing, fluid in said bulb, bellows and second line, a wick disposed about at least a portion of the bulb, vapor passing through the first connecting line to the casing and condensing therein to provide a supply of moisture for said wick, variation in pressure in the condenser varying the pressure in said casing with a substantially corresponding variation in saturation temperature as reflected by said bulb, said casing having an outlet therein for condensate to prevent increase therein above a predetermined liquid level.

2. In combination with an absorption refrigeration system employing water as a refrigerant and including an absorber, an evaporator and a shell containing a member cooperating with the shell to form a generator, and a second member cooperating with the shell to form a condenser, the evaporator, absorber, generator and condenser being disposed in a closed circuit, a line connected to the tubes of the condenser through which cooling fluid is supplied to the condenser, a second line connected to the tubes of the condenser through which cooling fluid is withdrawn from the condenser, a control member in one of said lines for regulating the flow of cooling fluid through the condenser and means for governing the operation of said control member, said governing means including a casing, a line connecting the casing with the shell, a bulb in said casing connected by a second line to a bellows exteriorly of the casing, fluid in said bulb, bellows and connecting line, a wick disposed about at least a portion of said bulb, vapor in the shell passing through the first line to the casing and condensing therein to provide a supply of moisture for the wick, variation in pressure in the shell varying the pressure in the casing with a substantially corresponding variation in saturation temperature as reflected by the bulb, and a purge arrangement adapted to withdraw non-condensible gases from the shell and the casing, said purge arrangement serving to maintain a desired level of condensate in the casing.

3. In combination with an absorption refrigeration system employing water as a refrigerant and including an absorber, an evaporator and a shell containing a member cooperating with the shell to form a generator, and a second member cooperating with the shell to form a condenser, means for passing cooling fluid through the tubes of the condenser, a member for regulating flow of cooling fluid through the tubes of the condenser, and means responsive to variation in saturation temperature corresponding substantially to variation in pressure in the condenser to actuate the regulating member, said means including a casing, a line connecting the casing with the shell, a bulb in said casing connected by a second line to a bellows exteriorly of the casing, fluid in said bulb, bellows and second line, a wick disposed about at least a portion of the bulb, vapor in the shell passing through the first line to the casing and condensing therein to provide a supply of moisture for the wick, variation in pressure in said shell varying the pressure in said casing with a substantially corresponding variation in saturation temperature as reflected by the bulb, said casing having an outlet therein for condensate to prevent increase therein above a predetermined liquid level.

4. In combination with an absorption refrigeration system employing water as a refrigerant and including an absorber, an evaporator, a generator and a condenser disposed in a closed circuit, means for passing cooling fluid through the tubes of the condenser, a member for regulating flow of cooling fluid through the tubes of the condenser and a device to actuate the regulating member in response to a variation in saturation temperature corresponding substantially to variation in pressure in the condenser, said device including a member exposed to condenser pressure and means for wetting said member whereby it reflects saturation temperature corresponding substantially to condenser pressure.

5. In combination with an absorption refrigeration system employing water as a refrigerant and including an absorber, an evaporator, a generator and a condenser disposed in a closed circuit, means for passing cooling fluid through the tubes of the condenser, a member for regulating flow of cooling fluid through the tubes of the condenser, and a device to actuate the regulating member in response to a variation in saturation temperature corresponding substantially to variation in pressure in the condenser, said device including a casing connected to the condenser, permitting vapor to pass from the condenser to the casing and permitting substantially condenser pressure to exist in the casing, means for condensing at least a portion of the vapor in the casing, and means for reflecting a variation in saturation temperature in the casing.

ALEXIS A. BERESTNEFF.
WILLIAM L. McGRATH.

REFERENCES CITED

The following references are of record in the file of this patent:

UNITED STATES PATENTS

| Number | Name | Date |
|---|---|---|
| 1,477,127 | Kasley | Dec. 11, 1932 |
| 2,356,638 | Williams | Aug. 22, 1944 |
| 2,379,177 | Bichowsky | June 12, 1945 |